B. E. BLAIR.
SCALE.
APPLICATION FILED JULY 7, 1909.
959,837.
Patented May 31, 1910.
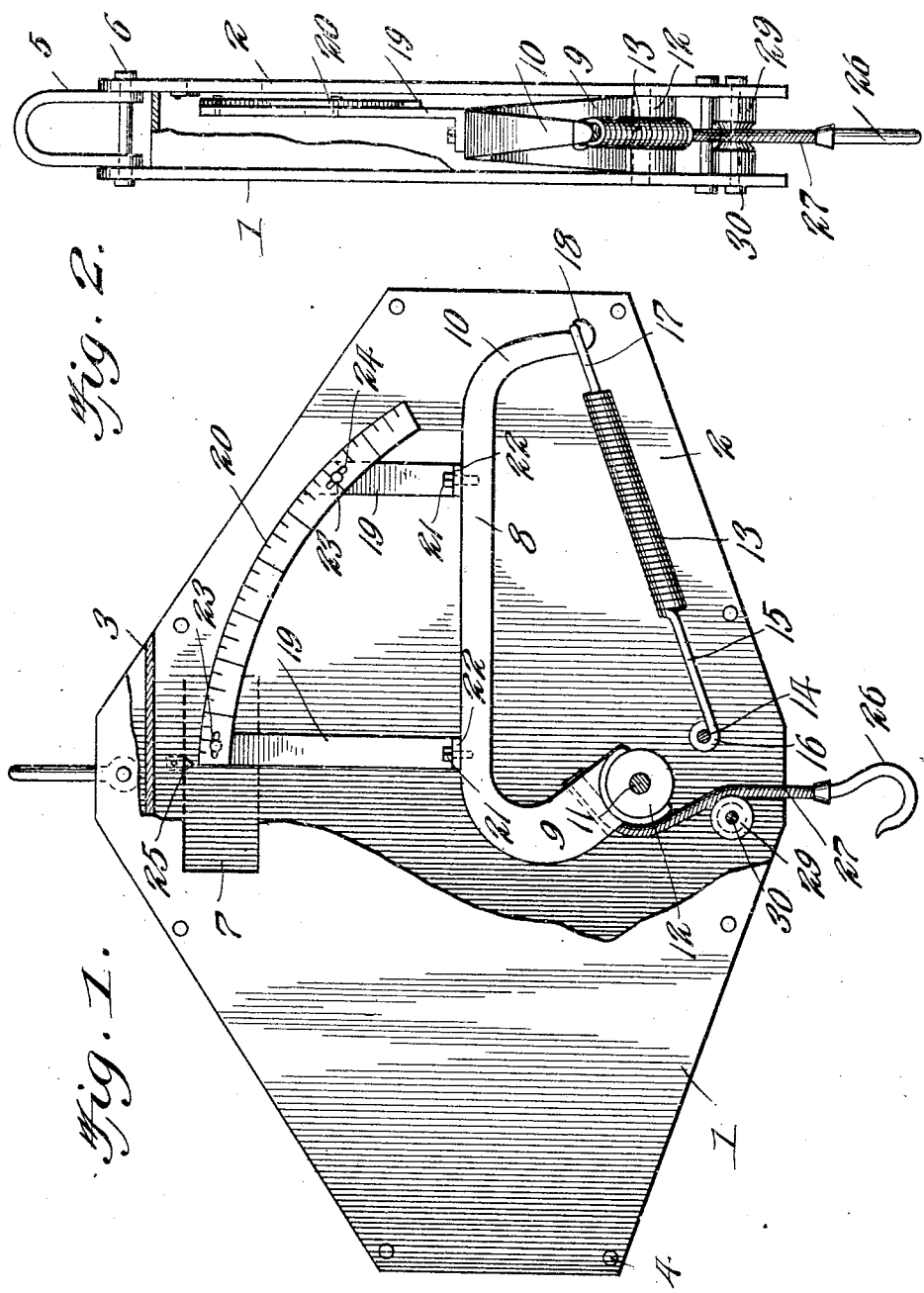
Witnesses
Frank B. Hoffman
John F. Byrne
Inventor
Bert E. Blair
By Victor J. Evans
Attorney

UNITED STATES PATENT OFFICE.

BERT E. BLAIR, OF BARRE, VERMONT.

SCALE.

959,837. Specification of Letters Patent. Patented May 31, 1910.

Application filed July 7, 1909. Serial No. 506,348.

*To all whom it may concern:*

Be it known that I, BERT E. BLAIR, a citizen of the United States, residing at Barre, in the county of Washington and State of Vermont, have invented new and useful Improvements in Scales, of which the following is a specification.

My invention relates to improvements in weighing scales.

The primary object of the invention is the provision of a weighing scale which shall be strong, durable and efficient, and which may be manufactured and sold at a comparatively low cost.

With the above and other objects in view, the invention consists in the novel construction, combination and arrangement of parts hereinafter fully described and claimed, and illustrated in the accompanying drawing, wherein:—

Figure 1 is a view in side elevation of a weighing scale constructed in accordance with my invention, a portion of the front wall of the casing of the scale being broken away, and Fig. 2 is a view in end elevation of the scale, a portion of the end wall of the casing of the scale being broken away.

Referring to the drawing by reference numerals, 1 designates the front, 2 the rear, and 3 the end wall of the casing of my improved weighing scale. The walls are secured in assembled relation through the medium of rivets 4. A bail 5 is pivotally secured to the front and rear walls of the casing by means of a bolt 6, said bail providing means by which the weighing scale may be suspended from a suitable support. The front wall of the casing is provided with an opening 7 through which the dial plate of the weighing scale can be viewed.

A beam 8, provided with offset arms 9 and 10, is pivotally secured within the casing by means of a pin 11, the pin passing through a hub 12 formed on the free end of the arm 9. A contractile coiled spring 13, which is secured at one end to the front and rear walls of the casing by a bolt 14 and which is secured at its opposite end to the arm 10 of the beam 8, retains the beam in normal position. The bolt 14 is located to one side of the pin 11 so as to prevent the spring 13 from contacting with the beam 8 during the movement of the beam. At one end the spring 13 is provided with an extension 15 which terminates in a loop 16, the bolt 14 passing through the loop. At its other end the spring 13 is provided with a loop 17 which embraces the arm 10, the loop engaging the hook 18 formed on the arm.

Arms 19, to which are secured a dial plate 20, are secured to the beam 8, by bolts 21 passing through angular projections 22 on the arms to engage the beam. The dial plate 20 is provided with lines and graduations, and it is secured to the arms 19 by bolts 23, said bolts passing through elongated slots 24 in the dial plate and engaging the arms. The manner in which the dial plate 20 is secured to the arms 19 permits the dial plate to be viewed through the opening 7 of the front plate 1 of the casing, an indicator 25 being secured to said wall for coöperation with the dial plate. The manner in which the dial plate 20 is secured to the arms 19 also permits it to be adjusted upon arms, whereby to enable the scale to be readily and quickly standardized.

A hook 26 to which a scale pan is adapted to be secured, is suspended from the arm 9 of the beam 8 by a flexible element 27 which preferably consists of a short section of steel rope. The element 27 passes over a grooved pulley 29 journaled between the front and rear walls of the casing on a bolt 30.

When an article is placed upon the scale pan, a downward pull is exerted upon the hook 26, such pull turning the beam 8 upon its pivot 11 and moving the dial plate 20 with respect to the indicator 25. The movement of the beam 8 is resisted by the spring 13, and the weight of the article on the scale pan can be determined from the dial plate 20.

It should be apparent from the above description, taken in connection with the accompanying drawing, that I provide a weighing scale which comprises comparatively few parts, one which is durable and efficient, and one which may be manufactured and sold at a comparatively low cost.

While I have described the method of operation of the invention, together with the apparatus which I now consider to be the best embodiment thereof, I desire to have it understood that the apparatus shown is merely illustrative and that such changes may be made when desired as are within the scope of the claims.

Having thus described the invention what is claimed as new is:—

1. A weighing scale comprising a casing provided with an opening in one of its walls, an indicator secured to said wall, a bail secured to the casing, a beam pivotally secured at one end within the casing, a spring secured at one end to the casing and at its opposite end to the free end of the beam, arms secured to the beam, a dial plate secured to the arms, a flexible element secured to the beam, and a hook secured to the flexible element.

2. A weighing scale comprising a support, a beam pivotally secured at one end to said support, a spring secured at one end to said support and at its opposite end to the free end of the beam, arms secured to the beam, an indicator, a dial plate adjustably secured to the arms for coöperation with the indicator, and a hook secured to the beam.

3. A weighing scale comprising a support, a beam pivotally secured at one end to the support, a spring secured at one end to the support and at its opposite end to the free end of the beam, an indicator, arms secured to the beam, a dial plate secured to the arms for coöperation with the indicator, a roller journaled on the support, a flexible element secured at one end to the beam and passing over the roller, and a hook secured to the free end of the flexible element.

In testimony whereof I affix my signature in presence of two witnesses.

BERT E. BLAIR.

Witnesses:
J. WARD CARVER,
E. C. GLYSSON.